United States Patent [19]

Spirkovska et al.

[11] Patent Number: 5,333,210
[45] Date of Patent: Jul. 26, 1994

[54] METHOD AND SYSTEM FOR PATTERN ANALYSIS USING A COARSE-CODED NEURAL NETWORK

[75] Inventors: Liljana Spirkovska; Max B. Reid, both of Sunnyvale, Calif.

[73] Assignee: The United States of America as represented by the Administrator of the National Aeronautics and Space Administration, Washington, D.C.

[21] Appl. No.: 908,141
[22] Filed: Jul. 2, 1992
[51] Int. Cl.$^5$ ............................................. G06K 9/46
[52] U.S. Cl. ........................................ 382/15; 382/27
[58] Field of Search ....................... 382/14, 15, 54, 27; 395/21

[56] References Cited

U.S. PATENT DOCUMENTS

| | | | |
|---|---|---|---|
| 4,802,103 | 1/1989 | Faggin et al. | 382/19 |
| 4,803,736 | 2/1989 | Grossberg et al. | 382/19 |
| 5,151,951 | 9/1992 | Ueda et al. | 382/16 |

OTHER PUBLICATIONS

Li et al., "Invariant Object Recognition Based on a Neural Network of Cascaded RCE Nets", 1990, vol. 2, pp. 845–854.
Rosen et al., "Adaptive Coarse–Coding for Neural Net Controllers", 1991, vol. 1, pp. 493–499.
Reid et al., "simultaneous position, scale, and rotation invariant pattern classification using third–order neural networks", Int. J. of Neural Networks, 1, 1989, pp. 154–159.
Reid et al., "Rapid Training of Higher–Order Neural Networks for Invariant Pattern Recognition", Proceedings of Joint Int. Conf. on Neural Networks, Washington, D.C. Jun. 18–22, 1989, vol. 1, pp. 689–692.
Spirkovska et al., "Connectivity Strategies for Higher–Order Neural Networks Applied to Pattern Recognition", Int. Joint Conf. on Neural Networks, San Diego, Calif., Jun. 17–21, 1990, vol. I, pp. 21–26.
Rosenfeld et al, "A Survey of Coarse–Coded Symbol Memories", Proc. of the 1988 Connectionist Models Summer School, Carnegie–Mellon Univ., Jun. 17–26, 1988, pp. 256–264.
Giles et al., "Encoding Geometric Invariances in Higher–Order Neural Networks", Neural Information Processing Systems, American Institute of Physics Conference Proceedings, 1988, pp. 301–309.
Giles et al., "Learning, Invariance, and Generalization in High–Order Neural Networks", Applied Optics, 1987, vol. 26, pp. 4972–4978.
Specht, "Probabilistic Neural Networks and the Polynomial Adaline as Complimentary Techniques for Classification", IEEE Transactions on Neural Networks, vol. 1, No. 1, pp. 111–121, Mar. 1990.
Lapedes et al., "Programming a Massively Parallel, Computation Universal System: Static Behavior", American Institute of Physics, pp. 283–298, Mar. 1986.
Lippmann, "An Introduction to Computing with Neural Nets", IEEE ASSP Magazine, pp. 4–22, Apr. 1987.
Yager, "On the Aggregation of Processing Units in Neural Networks", Machine Intelligence Institute, Iona College, pp. II-327-II-333.
Fukaya et al., "Two–Level Neural Networks: Learning by Interaction with Environment", IEEE First Int. Conf. on Neural Networks, Jun. 21, 1987.
Lippmann, "Pattern Classification Using Neural Networks", IEEE Communications Magazine, pp. 47–56, Nov. 1989.
Nielson, "Neurocomputing Applications: Sensor Processing, Control, and Data Analysis", Neurocomputing, 1990 Addison-Wesley.

Primary Examiner—Stephen Chin
Assistant Examiner—Timothy J. May
Attorney, Agent, or Firm—Darrell G. Brekke; Guy Miller; John R. Manning

[57] ABSTRACT

A method and system for performing pattern analysis with a neural network coarse-code a pattern to be analyzed so as to form a plurality of sub-patterns collectively defined by data. Each of the sub-patterns comprises sets of sub-pattern data. The neural network includes a plurality of fields, each field being associated with one of the sub-patterns so as to receive the sub-pattern data therefrom. Training and testing by the neural network then proceeds in the usual way, with one modification: the transfer function thresholds the value obtained from summing the weighted products of each field over all sub-patterns associated with each pattern being analyzed by the system.

30 Claims, 9 Drawing Sheets

METHOD AND SYSTEM FOR PATTERN ANALYSIS USING A COARSE-CODED NEURAL NETWORK

ORIGIN OF THE INVENTION

The invention described herein was made by employees of the U.S. government and may be manufactured and used by or for the government without the payment of any royalties thereon or therefor.

BACKGROUND OF THE INVENTION

The present invention is directed to methods and systems for pattern analysis using neural networks and, more particularly, to methods and systems for pattern analysis using neural networks having an increased resolution input field with less network interconnections.

Various techniques have been applied to the problem of distinguishing between a set of patterns invariant to changes in the position, size or angular orientation of the patterns. These techniques include statistical, symbolic, optical and neural network techniques.

The statistical, symbolic, and optical techniques are based on a two-step process of feature extraction followed by classification. For the feature extraction step, the system designer is required to specify a set of attributes capable of separating a set of training patterns into subgroups containing all distorted (i.e., translated, scaled and/or in-plane rotated) views of each distinct pattern. The system then organizes these features and uses them to classify incoming patterns.

There are at least three major disadvantages of these two-step approaches:

(1) It is not always obvious which features are sufficient for separating the set of training patterns such that all distorted views of a pattern will be classified as belonging to the same group.

(2) These approaches require a fairly large, if not exhaustive, set of training patterns to correctly organize the features such that novel views of the patterns will be correctly classified.

(3) The training time increases as the number of features and the training set size increase. Thus, these systems tend to be very slow.

A different approach to the problem of distortion invariant pattern recognition uses neural networks. Unlike the methods discussed above, in the neural network approach, the system is provided only with a set of distorted views of a set of distinct patterns (i.e., a set of translated, scaled, and/or in-plane rotated views of each distinct pattern) and, through training, learns what the relevant features are as well as how to distinguish between the distinct patterns.

Multi-layer, first-order neural networks using the backward error propagation (backprop) algorithm for training have been shown to be effective for distortion invariant pattern recognition. Using this method, the neural network is provided with a large set of distorted views of a set of patterns. The neural network weights are then adjusted using the back propagation learning rule such that the neural network correctly classifies a specified percentage of the training set patterns. The major disadvantages of this system are:

(1) The training set needs to be large enough and fairly indicative of the expected distortions so that the neural network can generalize rather than memorize what features to look for.

(2) The training time increases with the size of the training set and thus these systems are also fairly slow.

Furthermore, these first order neural networks achieve only 80%–90% recognition accuracy.

Progress in higher-order neural networks (HONNs) has been more promising. Reid et al. (M. B. Reid, L. Spirkovska, and E. Ochoa, "Simultaneous Position, Scale, and Rotation Invariant Pattern Classification Using Third-Order Neural Networks", Int. J. of Neural Networks, 1, 1989, pp. 154–159; and M. B. Reid, L. Spirkovska, and E. Ochoa, "Rapid Training of Higher-Order Neural Networks for Invariant Pattern Recognition", Proc. of Joint Int. Conf. on Neural Networks, Wash., D.C., Jun. 18–22, 1989, vol. 1, pp. 689–692, the disclosures of which are incorporated herein by reference in their entireties) have demonstrated that a third-order neural network is capable of achieving 100% accuracy in distinguishing between two patterns in a 9×9 pixel input field regardless of position, scale or in-plane rotation changes. The network needed to be trained on only one view of each object, and required only 10 to 20 passes to learn to distinguish between the objects in any in-plane rotational orientation, scale, or translated position. Thus, for pattern recognition, HONNs are superior to multi-layered first-order backprop trained networks in terms of training time, training set size and accuracy.

Figure 1A:
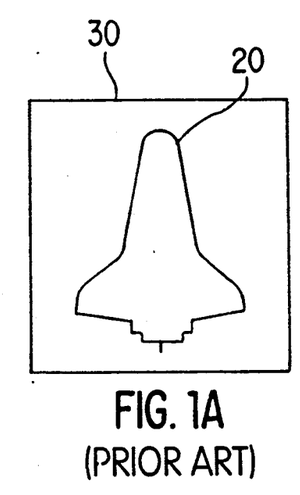
FIGS. 1A–1D are views of an object and distortions of the object in an input field.
Figure 1B:
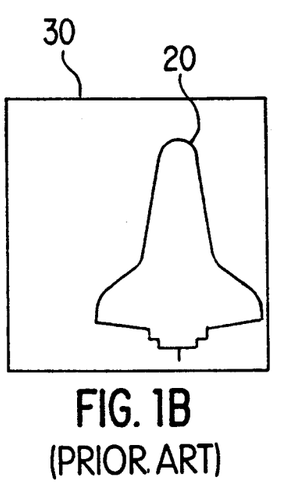
Figure 1C:
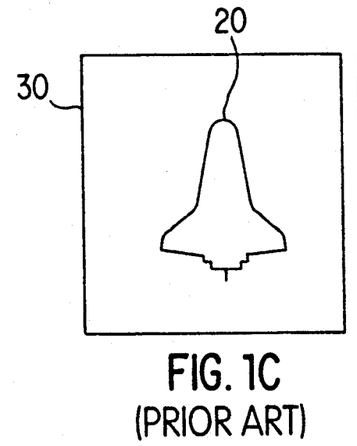
Figure 1D:
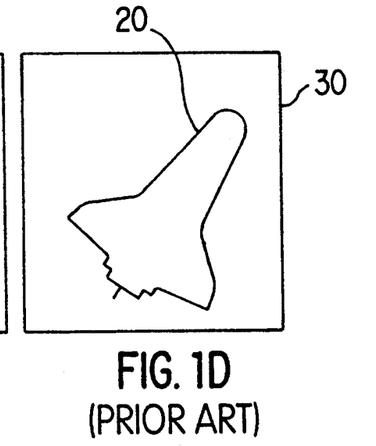

As an example, the use of a HONN for recognizing two-dimensional views of objects will first be discussed. FIG. 1A is a view of an object 20 (the space shuttle orbiter) in a two-dimensional input field 30. FIG. 1B is a view of object 20 after it has been translated across input field 30. FIG. 1C is a view of object 20 after it has been reduced in size (scaled) in input field 30. FIG. 1D is a view of object 20 after it has been rotated in-plane in input field 30. The output of an output node, denoted by $y_i$, for output node i in a general HONN is given by:

$$y_i = \Theta(\Sigma_j w_{ij} x_j + \Sigma_j \Sigma_k w_{ijk} x_j x_k + \Sigma_j \Sigma_k \Sigma_l w_{ijkl} x_j x_k x_l + \ldots) \quad (1)$$

where $\Theta(f)$ is a non-linear threshold function such as, for example, the hard limiting transfer function given by:

$$y_i = 1, \text{ if } f > 0, \quad (2)$$

$$y_i = 0, \text{ otherwise};$$

the lower case x's are the excitation values of the input nodes; and the interconnection matrix elements, w, determine the weight that each input is given in the summation.

Using information about relationships expected between the input nodes under various distortions, the interconnection weights can be constrained such that invariance to given distortions is built directly into the network architecture. See Giles et al. (G. L. Giles and T. Maxwell, "Learning, Invariances, and Generalization in High-Order Neural Networks", Applied Optics, 26, 1987, pp. 4972–4978; and G. L. Giles, R. D. Griffin and T. Maxwell, "Encoding Geometric Invariances in Higher-Order Neural Networks", Neural Information Processing Systems, American Institute of Physics Conference Proceedings, 1988, pp. 301–309, the disclosures of which are incorporated herein by reference in their entireties) for a discussion of building invariance into HONNs.

Figure 2:
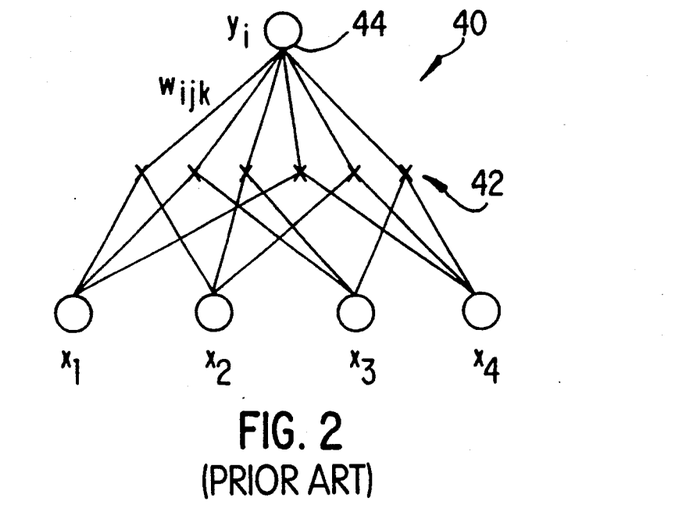
FIG. 2 illustrates a second-order neural network.

As an example, in a second-order neural network 40 as illustrated in FIG. 2, the inputs ($x_1$–$x_4$) are first combined in pairs at product points 42 (denoted by an X) to determine intermediate values, the intermediate values are weighted and summed at summation point 44, and then the output from output node $y_i$ is determined from the weighted sum of these intermediate values (i.e., the value determined at summation point 44) by applying the threshold function to the value determined at summation point 44. In accordance with equation (1) above, the output for a strictly second-order network is given by the function:

$$y_i = \Theta\ (\Sigma_j \Sigma_k\ w_{ijk}\ x_j\ x_k). \qquad (3)$$

The invariances achieved using this architecture depend on the constraints placed on the weights.

Figure 3A:
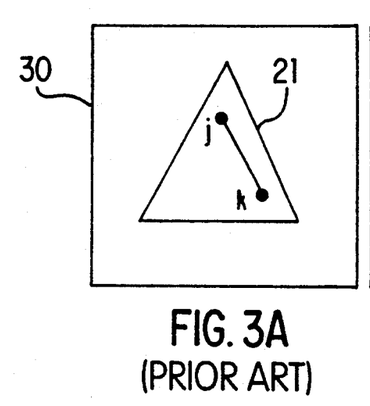
FIGS. 3A and 3B are views of an object and of a translated, scaled view of the object.
Figure 3B:
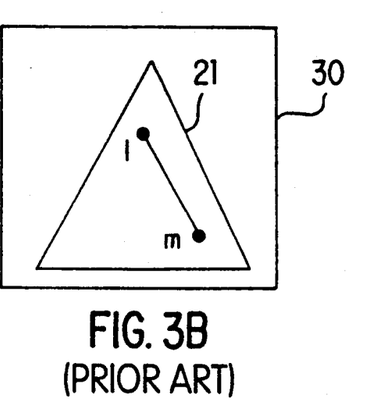

In an example, each pair of input pixels combined in a second-order network define a line with a certain slope. As shown in FIGS. 3A and 3B, when an object 21 is moved (translated) or scaled in an input field 30, the two points in the same relative positions within the object still form the end points of a line having the same slope. Thus, provided that all pairs of points which define the same slope are connected to the output node using the same weight, the network will be invariant to distortions in scale and translation. In particular, for two pairs of pixels (j, k) and (l, m), with coordinates ($x_j$, $y_j$), ($x_k$, $y_k$), ($x_l$, $y_l$), and ($x_m$, $y_m$) respectively, the weights are constrained according to:

$$w_{ijk} = w_{ilm},\ \text{if}\ (y_k - y_j)/(x_k - x_j) = (y_m - y_l)/(x_m - x_l). \qquad (4)$$

Figure 4A:
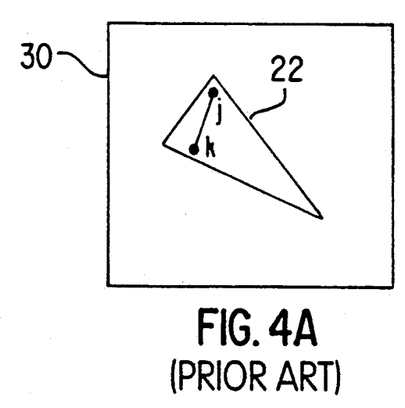
FIGS. 4A and 4B are views of an object and of a translated, rotated view of the object.
Figure 4B:
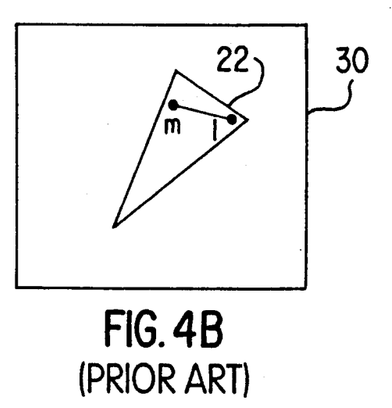

Alternatively, the pair of points combined in a second-order network may define a distance. As shown in FIGS. 4A and 4B, when an object 22 is moved (translated) across input field 30 or rotated within a plane, the distance between a pair of points in the same relative positions on the object does not change. Thus, as long as all pairs of points which are separated by equal distances are connected to the output with the same weight, the network will be invariant to translation and in-plane rotation distortions. The weights for this set of invariances are constrained according to:

$$w_{ijk} = w_{ilm},\ \text{if}\ ||d_{jk}|| = ||d_{lm}||. \qquad (5)$$

That is, the magnitude of the vector defined by pixels j and k ($d_{jk}$) is equal to the magnitude of the vector defined by pixels l and m ($d_{lm}$).

Thus, when invariance to translation and scale (without invariance to rotation) or to translation and rotation (without invariance to scale) is desired, a second order neural network is appropriate.

Figure 5:
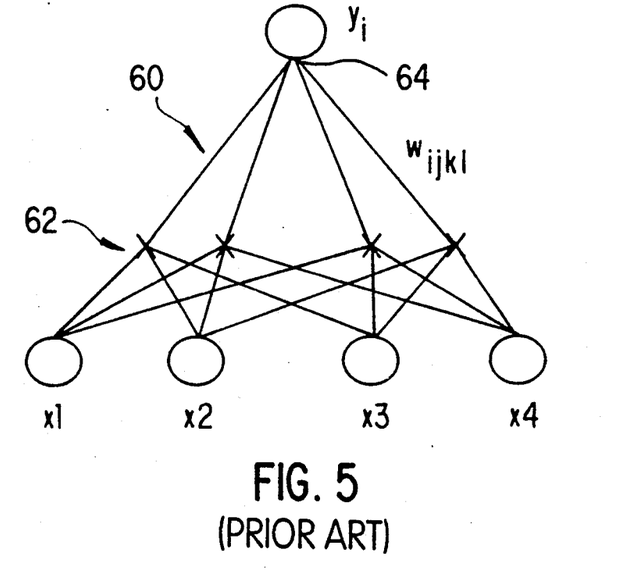
FIG. 5 illustrates a third-order neural network.

To achieve invariance to translation, scale, and in-plane rotation simultaneously, a third order neural network 60, as shown in FIG. 5, can be used. The third order neural network 60 illustrated in FIG. 5 includes input nodes $x_1$–$x_4$, connected in triplets to product points 62 (which are similar to product points 42 in the second-order neural network of FIG. 2 except that the excitation values of three input nodes are multiplied thereat), where intermediate values are determined. The intermediate values determined at product points 62 are weighted and summed at summation point 64, and the summation is supplied to a single output node $y_i$.

The output for a strictly third-order neural network shown in FIG. 5, in accordance with equation (1) is given by the function:

$$y_i = \Theta\ (\Sigma_j \Sigma_k \Sigma_l\ w_{ijkl}\ x_j\ x_k\ x_l). \qquad (6)$$

Figure 6A:
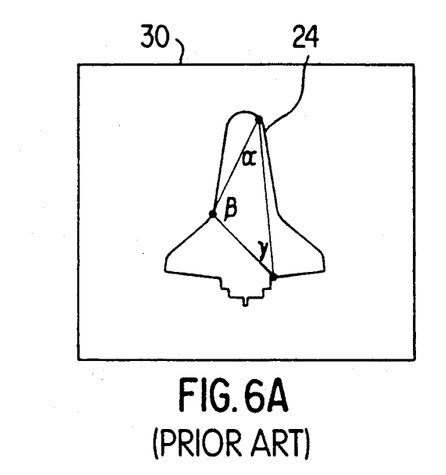
FIGS. 6A and 6B are views of an object and of a translated, scaled, rotated view of the object.
Figure 6B:
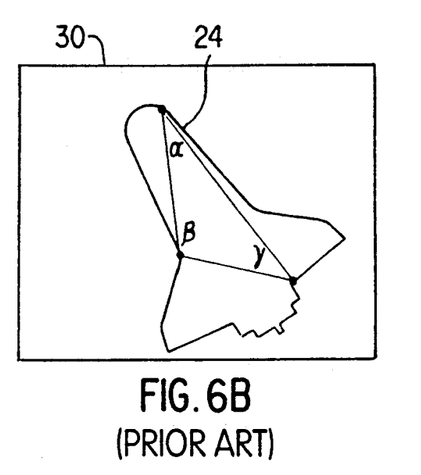

That is, when the input field 30 is a matrix of pixels, as is commonly used for object recognition, all sets of input pixel triplets in object 24 are used to form triangles having included angles ($\alpha$, $\beta$, $\gamma$). As shown in FIGS. 6A and 6B, when object 24 is translated, scaled, or rotated in-plane, the three points in the same relative positions on the object 24 still form the included angles ($\alpha$, $\beta$, $\gamma$). In order to achieve invariance to all three distortions, all sets of triplets forming similar triangles are connected to the output node of the neural network with the same weight. That is, the weight for the triplet of inputs (j, k, l) is constrained to be a function of the associated included angles ($\alpha$, $\beta$, $\gamma$) such that all elements of the alternating group on three elements are equal:

$$w_{ijkl} = w_{(i,\alpha,\beta,\gamma)} = w_{(i,\beta,\gamma,\alpha)} = w_{(i,\gamma,\alpha,\beta)}. \qquad (7)$$

Note that the order of the angles matters, but not which angle is measured first.

Because HONNs are capable of providing non-linear separation using only a single layer, once invariances are incorporated into the architecture, the neural network can be trained (i.e., values assigned to the weights) using a simple rule of the form:

$$\Delta w_{ijk} = (t_i - y_i)\ x_j\ x_k, \qquad (8)$$

for a second-order neural network, or $$\Delta w_{ijkl} = (t_i - y_i)\ x_j\ x_k\ x_l, \qquad (9)$$

for a third-order neural network, where the expected training output, t, the actual output, y, and the inputs, x, are all binary. Prior to training, the weights, w, can be set to 0, or some other random number.

Second and third order neural networks as described above are disclosed in the above incorporated references of Reid et al.

The main advantage of building invariance to geometric distortions directly into the architecture of the HONN is that the network is forced to treat all distorted views of an object as the same object. Distortion invariance is achieved before any input vectors (training patterns) are presented to the network. Thus, the network needs to learn to distinguish between just one view of each object, not numerous distorted views of each object.

While building invariances into the network greatly reduces the number of independent weights which must be learned, some storage must still be used to associate each triplet of inputs to a set of included angles.

A disadvantage of HONNs is that as their order and the number of input nodes increases, the number of interconnections required (i.e., interconnections between the input nodes, $x_{1-n}$ and the product points 42 or 62) becomes excessive. For example, a network with M inputs and one output using rth order terms requires M-choose-r interconnections. For higher orders, this number, which is on the order of $M^r$ is clearly excessive.

In the field of two-dimensional object recognition, for example, wherein an N×N pixel input field is used, combinations of three pixels (i.e., in a third order neural network) can be chosen in $N^2$-choose-3 ways. Thus, for a 9×9 pixel input field, the number of possible triplet combinations (for a third-order neural network) is 81-choose-3 or 85,320. Increasing the resolution to 128×128 pixels increases the number of possible interconnections to $128^2$-choose-3 or $7.3 \times 10^{11}$, a number too great to store on most machines. For example, on a Sun 3/60 with 30 MB of swap space, a maximum of 5.6 million (integer) interconnections can be stored, limiting the input field size for fully connected third-order neural networks to about 18×18 pixels. Furthermore, the number of interconnections required to fully connect a 128×128 pixel input field (about $10^{12}$) is far too large to allow a parallel implementation in any hardware technology that will be commonly available in the foreseeable future.

Spirkovska et al. (L. Spirkovska and M. B. Reid, "Connectivity Strategies for Higher-Order Neural Networks Applied to Pattern Recognition", Int. Joint Conf. on Neural Networks, June, 1990, Vol. 1, pp. 21-26, the disclosure of which is incorporated herein by reference in its entirety) discusses techniques for reducing the number of interconnections in a HONN, so that the number of input nodes can be increased. In particular, regional connectivity was evaluated, in which triplets of pixels are connected to the output node only if the distances between all of the pixels comprising the triplet fell within a set of preselected regions. Using this strategy, the input field size was increased to 64×64 while still retaining many of the advantages shown previously, such as a small number of training passes, training on only one view of each object, and successful recognition invariant to in-plane rotation and translation.

However, using regional connectivity, images invariant to changes in scale could not be recognized. Also, as the input field size increased, the amount of time for each pass on a sequential machine increased dramatically. The 64×64 pixel input field network required on the order of days on a Sun 3/60 to learn to distinguish between two objects. This is despite the fact that the number of interconnections was greatly reduced from the fully connected version. The number of logical comparisons required to determine whether the distances between pixels fall within the preselected regions was still huge.

SUMMARY OF THE INVENTION

An object of the present invention is to provide methods and systems for pattern analysis using neural networks having high resolution input fields.

Another object of the present invention is to reduce the number of interconnections required in a neural network having a high resolution input field.

To achieve the foregoing and other objects and advantages, and to overcome the shortcomings discussed above, a pattern analysis system and method which use a neural network coarse-code pattern to be analyzed so as to form a plurality of sub-patterns represented as respective sets of sub-pattern data. The plurality of sub-patterns are formed by overlaying a plurality of offset overlapping coarse-code fields, comprised of coarse-code units having a predetermined size, over the pattern so as to represent an input pattern comprised of a matrix of units having a greater number and smaller size than the number and size of the units in the coarse-code fields. Input values are assigned to each of the coarse-code units in the coarse-code fields in accordance with the input pattern over which the coarse-code fields are overlaid. That is, for example, a unit is turned ON if it overlies part of the pattern; otherwise the unit remains OFF.

The neural network includes a plurality of fields, equal in number to the plurality of sub-patterns, so that each field corresponds to one of the sub-patterns. Each field includes a plurality of input nodes, and at least one summation point where weighted products of predetermined combinations of the input nodes are summed so as to determine a sub-pattern value for each summation point. The neural network also includes at least one output node, coupled to corresponding summation points from a plurality of the fields, which performs a threshold function on a pattern value received at that output node to provide an output signal.

The input nodes from each field receive the sub-pattern data of the sub-pattern which corresponds to that field. Each field of the neural network then summarizes the weighted products of the predetermined combinations of its input nodes to determine a sub-pattern value at each summation point for each field. The sub-pattern values at the corresponding summation points from a plurality of fields are then summarized to produce a pattern value, which is supplied to the output node coupled to these corresponding summation points. The output node then performs its threshold function on the pattern value received thereat to produce an output signal. The output signal from the output node is used to classify the pattern.

When the pattern analysis system and method are used to recognize patterns, the system is first trained by supplying sub-patterns from one or more coarse-coded training patterns to the input nodes of the neural network for subsequent evaluation by the neural network. The values of the weights for the products of predetermined combinations of input nodes are then assigned so that a unique output signal will be produced by the output node(s) of the neural network for each training pattern. A pattern to be tested is then coarse-coded, and the sub-patterns representative of the test pattern are received by the input nodes of respective fields of the trained neural network. Based on the output signal(s) produced for the test pattern, a determination as to which of the plurality of training images corresponds to the test pattern can be made.

The present invention is particularly useful with HONNs in that the number of input nodes in each field of the neural network is equal to the number of units in each corresponding sub-pattern. Accordingly, since the number of neural network interconnections is related to the number of input nodes in each field, which number is much less than the total number of units in the high resolution input pattern formed by the plurality of offset overlapping coarse-code fields, data representative of the high resolution input pattern is provided without the combinatoric explosion of interconnections that would be associated with the high resolution input pattern without coarse-coding. That is, a large input field is broken into a plurality of smaller fields, each of which can be analyzed by the neural network.

BRIEF DESCRIPTION OF THE DRAWINGS

The invention will be described in detail with reference to the following drawings in which like reference numerals refer to like elements and wherein.

DETAILED DESCRIPTION OF PREFERRED EMBODIMENTS

The references to Reid et al., Spirkovska et al. and Giles et al., discussed above, are incorporated herein by reference. These references disclose neural networks, including HONNs of the second and third order, which can be used (with modifications to be discussed below) in the present invention. Although the present invention is particularly suited for HONNs because it is in HONNs that the explosion of interconnections is most extreme, the present invention has use in other neural networks, and especially in neural networks where the number of input nodes and network interconnections are such that the memory of the hardware used therewith becomes taxed. Accordingly, while specific examples involving HONNs will be discussed, these examples are not meant to be limiting.

As used herein, the terminology "sub-pattern data" refers to data (usually binary in form) which is organized in sets, such as, for example, matrices. The sets of sub-pattern data can be square, or can have different dimensions in the x, y (and possibly z) directions. Additionally, while a cartesian coordinate system is used in the examples, it is also known, and thus possible, to use a polar coordinate system to define patterns for use by neural networks.

Pattern data can be used to represent objects, characters and other visible items (in which case the pattern data is also referred to as "pixel data"), and further can comprise non-visible items such as, for example, voice data, or other information.

As is known, neural networks can be used to perform a variety of different types of analyses on pattern data. One type of analysis, described in the above references and in the following description, is pattern recognition. Other types of analysis include, for example, classification of pattern-data and determining relationships between sets of pattern data.

An example of the manner in which the present invention can be applied to image patterns will now be described.

In accordance with this illustrative use of the present invention, an image pattern is coarse-coded to form a plurality of sub-patterns represented as sets of sub-pattern data (pixel data), and then each set of sub-pattern data is supplied to a corresponding field of the neural network. The output node(s) of the neural network then perform(s) a threshold function such as, for example, the hard limiting transfer function described above in equation (1) on a summation of the values determined for all fields in the network, instead of on each field individually.

Coarse coding of the pattern results in a plurality of sets of sub-pattern data representing sub-patterns of the original pattern, each sub-pattern having a resolution less than that of the pattern represented by all of said sub-patterns combined. Accordingly, a neural network having small fields (optimally, all having the same architecture) can be used to receive the sub-pattern data from each sub-pattern. Accordingly, the number of interconnections is reduced even when the pattern represented by all of the sub-pattern data has a high resolution.

Figure 7A:
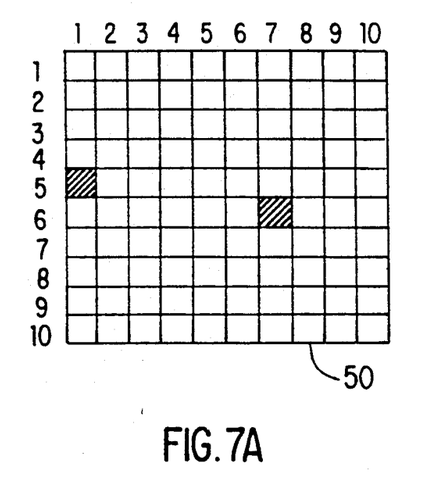
FIG. 7A illustrates an input field containing two ON pixels.
Figure 7B:
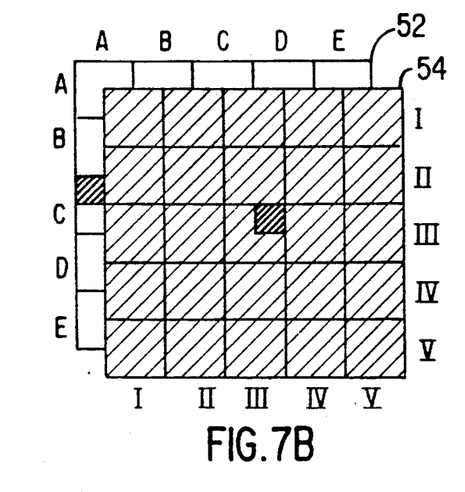
FIG. 7B illustrates two coarse-code fields which are offset and overlaid to form the higher resolution input field of FIG. 7A.

The coarse coding procedure used in the present invention involves overlaying fields (coarse-code fields) of coarser units (in this image recognition example the units correspond to pixels) in order to represent an input field comprised of smaller pixels, as shown in FIGS. 7A and 7B. FIG. 7A shows an input field 50 of size 10×10 pixels. FIG. 7B shows two offset but overlapping coarse-code fields 52, 54, each of size 5×5 coarse pixels. In this case, each coarse-code field 52, 54 is comprised of pixels which are twice as large (in both dimensions) as in FIG. 7A. To reference an input pixel using the two coarse-code fields requires two sets of coordinates. For example, pixel (x=7, y=6) on the original image of FIG. 7A would be referenced as the set of coarse pixels ((x=D, y=C) & (x=III, y=III)) in FIG. 7B, assuming a coordinate system of (A, B, C, D, E) for coarse-code field 52 and (I, II, III, IV, V) for coarse-code field 54. This is a one-to-one transformation. That is, each pixel on the original image can be represented by a unique set of coarse pixels.

The above transformation of an image (pattern) to a set of smaller images (sub-patterns) can be used to greatly increase the resolution possible in a neural network, especially in a HONN. For example, a fully-connected third-order neural network for a 10×10 pixel input field requires $10^2$-choose-3 or 161,700 interconnections. Using two fields of 5×5 coarse pixels requires just $5^2$-choose-3 or 2300 interconnections, accessed once for each coarse-code field. The number of required interconnections is reduced by a factor of about 70. For a larger input field, the savings are even greater. For example, with a 100×100 pixel input field, a fully connected third-order neural network requires $1.6 \times 10^{11}$ interconnections. If this field is represented as 10 fields of 10×10 coarse pixels, only 161,700 interconnections are necessary. The number of interconnections is decreased by a factor of about 100,000.

One aspect of coarse coding which needs to be addressed is how the part of the image which is not intersected by all coarse-code fields is handled. That is, how is pixel (1, 5) in the original image shown in FIG. 7A represented using the two coarse-code fields 52, 54 in FIG. 7B. There are at least two ways to implement coarse coding: (1) with wrap around; or (2) by using only the intersection of the fields. If coarse coding is implemented using wrap around, pixel (1, 5) could be represented as the set of coarse pixels ((A, C) & (V, II)). Alternatively, if coarse coding is implemented as the intersection of the coarse-code fields, the two coarse-code fields 52, 54 shown in FIG. 7B would be able to uniquely describe an input field of 9×9 pixels, not 10×10.

Using wrap around, the relationship between the number of coarse-code fields (n), input field size (IFS), and coarse-code field size (CFS) in each dimension is given by:

$$IFS = (CFS * n) \qquad (10)$$

On the other hand, using the intersection of fields implementation, the relationship between number of coarse-code fields, input field size, and coarse-code field size in each dimension is given by:

$$IFS = (CFS * n) - (n-1). \qquad (11)$$

The effect of input field size, IFS, is not significantly different with either implementation for small n. As discussed above, coding an image as a set of coarser images greatly increases the size of the input field possible in, for example, a higher-order neural network.

As an example of how coarse coding can be applied to HONNs, refer to FIGS. 8A-11. In order to train the neural network to distinguish between a "T" and a "C" in an 8×8 pixel input field 65, a neural network could be trained on the two images shown in FIGS. 8A and 9A directly, or by applying coarse coding. If, for example, a second or third order neural network were trained on the 8×8 input fields illustrated in FIGS. 8A and 9A, HONNs having an architecture similar to that shown in FIGS. 2 and 5 could be used. However, these HONNs would require 64 ($8^2$) input nodes and the appropriate number of interconnections to represent all possible pairs or triplets of pixel combinations.

Figure 8A:
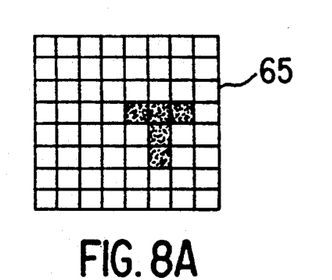
FIG. 8A illustrates an 8×8 input field containing a pattern in the shape of a T.
Figure 8B:
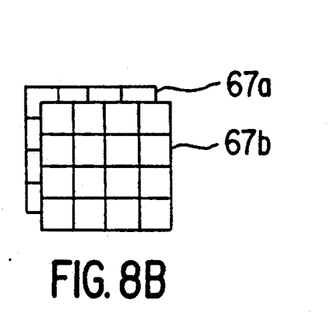
FIG. 8B illustrates two 4×4 coarse-code fields which can be used to coarse-code the 8×8 field of FIG. 8A.
Figure 9A:
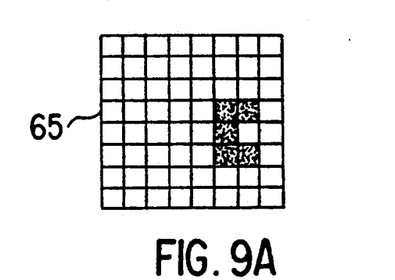
FIG. 9A illustrates an 8×8 input field containing a pattern in the shape of a C.
Figure 9B:
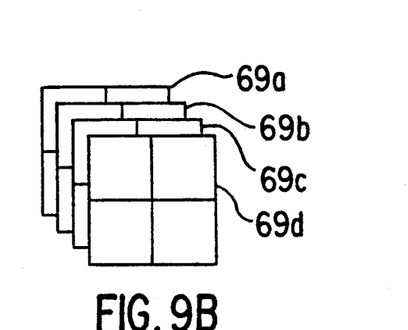
FIG. 9B illustrates four 2×2 coarse-code fields which can be used to coarse-code the 8×8 input field of FIG. 9A.

With coarse coding implemented using wrap around, as explained above, there are two possible combinations which will provide an effective input field of 8×8 pixels: two coarse-code fields 67a, 67b of 4×4 coarse pixels, illustrated in FIG. 8B, or four coarse-code fields 69a-69d of 2×2 coarse pixels, illustrated in FIG. 9B.

In the present example, the coarse-code fields 67a and 67b illustrated in FIG. 8B are used. Applying coarse coding by using two coarse-code fields of 4×4 coarse pixels, as illustrated in FIG. 8B, the two images shown in FIGS. 8A and 9A are transformed into the four images $T_1$, $T_2$ and $C_1$, $C_2$ shown in FIG. 10.

Figure 10:
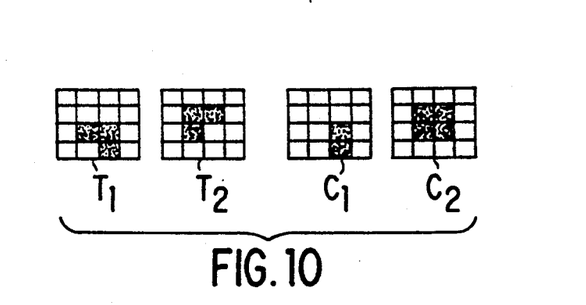
FIG. 10 illustrates the lower resolution sub-patterns formed when the coarse-code fields of FIG. 8B are used to coarse code the patterns illustrated in FIGS. 8A and 9A.

Note that the sub-patterns when combined do not form the actual original image. The sub-patterns are coarse-coded representations of an image. This is because an entire pixel in a coarse-code field is turned ON even if only a portion of that pixel overlies an ON portion of the original image. However, the combination of sub-patterns for each original image is distinct for its respective image, and therefore, can be used to distinguish between different images.

The sub-pattern defined by each coarse-code field can be represented as sets of sub-pattern data such as by the following vectors:

$T_1$: (0000000001100010)
$T_2$: (0000011001000000)
$C_1$: (0000000000100010)
$C_2$: (0000011001100000).

Training of the network then proceeds in the usual way (described in more detail below), with one modification: the transfer function thresholds the value obtained from summing the weighted products (triangles in the illustrative third-order neural network) over all coarse images associated with each training object. That is, $$y=1, \text{ if } \{\Sigma_n (\Sigma_j \Sigma_k \Sigma_l w_{jkl} x_j x_k x_l)\} > 0, y=0, \text{ otherwise,} \qquad (12)$$

where j, k and l range from 1 to the coarse-code field size squared (which in the above example would be 16), n ranges from 1 to the number of coarse fields, the x's represent coarse pixel values, and $w_{jkl}$ represents the weights associated with the triplet of inputs (j, k, l).

Figure 11:
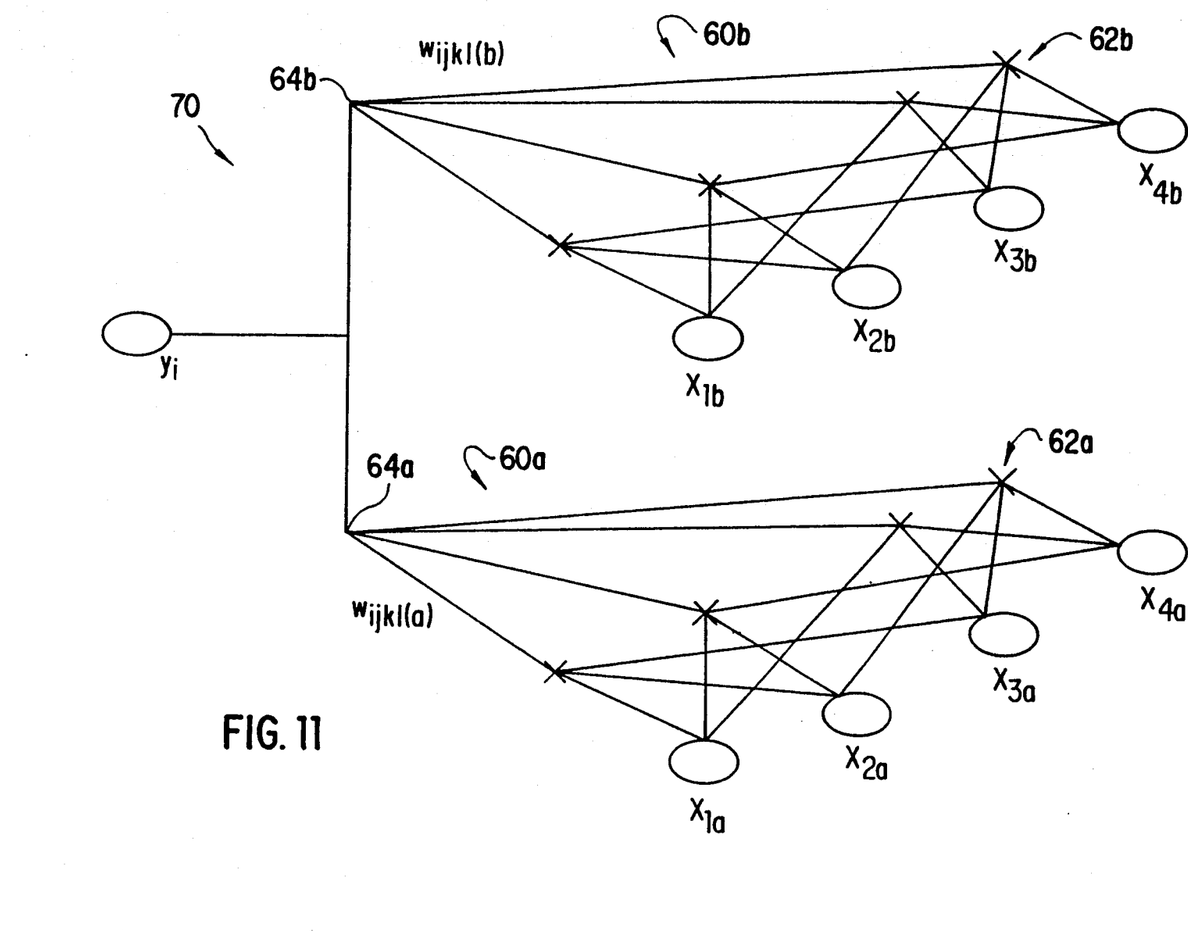
FIG. 11 illustrates a third-order neural network having two fields and a single output node which can be used to analyze a coarse-coded pattern in accordance with the present invention.

The architecture of the network is illustrated in FIG. 11. The neural network 70 of FIG. 11 is a third-order neural network, somewhat similar to the neural network of FIG. 5. The neural network of FIG. 11 differs from that of FIG. 5, in that the FIG. 11 neural network includes a plurality of fields (60a, 60b) the summation points (64a, 64b) of which are attached to output node $y_i$. This is in accordance with the relationship defined by equation (12). Each coarse-code field (containing the sub-pattern data) is associated with a corresponding one of the fields 60a, 60b, etc. Thus, for the two coarse-code fields 67a and 67b shown in FIG. 8B, the neural network would be provided with two fields, each field having 16 input nodes ($x_{1a}$-$x_{16a}$ for one field and $x_{1b}$-$x_{16b}$ for the other field). The neural network of FIG. 11 illustrates the first four input nodes for both fields 60a and 60b needed to receive inputs from coarse-code fields 67a and 67b.

In order to train the network, the values (vectors containing 1s and 0s) of patterns $T_1$ and $T_2$ are supplied to the input nodes of fields 60a and 60b respectively, and are associated with an output node signal of, for example 1. The same is done with values of patterns $C_1$ and $C_2$, except this combination of values are associated with an output node signal of, for example 0. Initially the weights, w, are all initialized to some random number such as, for example, 0. Then the network trains itself (i.e., assigns values to the respective weights using, for example, equation (9) with the constraints of equation (7) until equation (12) is satisfied).

Within each field of the neural network, the excitation value received by each triplet (or pair in a second order neural network) are multiplied together to form an intermediate value at product points 62a, 62b. Then the intermediate values obtained at the product points for each respective field are weighted and summed to produce a sub-pattern value at the summation point 64a, 64b of each field. These sub-pattern values are summed at output node $y_1$ to produce a pattern value, and then the transfer function is applied to the pattern value by output node $y_1$ to produce an output signal (1 or 0 in the present example).

During testing, an input image is again transformed into a set of coarse sub-patterns. Each of these coarser sub-patterns, represented, for example, as vectors are then presented to the network and the output value is determined using, for example, equation (12). The input pattern is recognized as the training pattern to which its output signal corresponds.

When each coarse-code field has the same size, as illustrated in FIGS. 7B, 8B and 9B, the architecture of each field (60a, 60b . . . ) in the neural network is the same. Moreover, the weights assigned to each weighted interconnection across all fields is the same for all corresponding weighted interconnections. For example, in FIG. 11, the value ($w_{ijkl(a)}$) of each weighted interconnection in field 60a is equal to the value ($w_{ijkl(b)}$) of each weighted interconnection in field 60b, for all similar values of i, j, k and l. This further reduces the number of interconnections which must be stored in memory. Thus, optimally, only a single field architecture needs to be stored, and is provided with the sub-pattern data from each coarse-code field.

If coarse-code fields having different sizes are used, all the neural network fields would not have the same architecture and would have to be separately stored. However this choice depends on the particular problem being addressed, and the network designer.

Additionally, as is known, when more than two distinct patterns are to be recognized, more than one output node $y_i$ is usually required. For example, neural networks having two output nodes (and using a threshold function that outputs either a 1 or a 0) can be used to distinguish between four patterns by combining the binary output of each output node to represent four different values such as (00, 01, 10, 11). In this case, referring to the example where similarly sized coarse-code fields are used, each neural network field would have a similar architecture including a plurality of summation points 64, each corresponding to a respective output node $y_i$. The plurality of fields would be combined (this can be visualized by stacking the fields on top of each other as is done in FIG. 11) so that each summation point in each field corresponds to a summation point in each of the other fields, defining a set of common summation points. (For example, summation points 64a and 64b define a set of common summation points.) Each set of common summation points is associated with an output node, which performs an appropriate threshold function on the pattern value (determined by summing the sub-pattern values of the summation points in the set) received by the output node.

Figure 12:
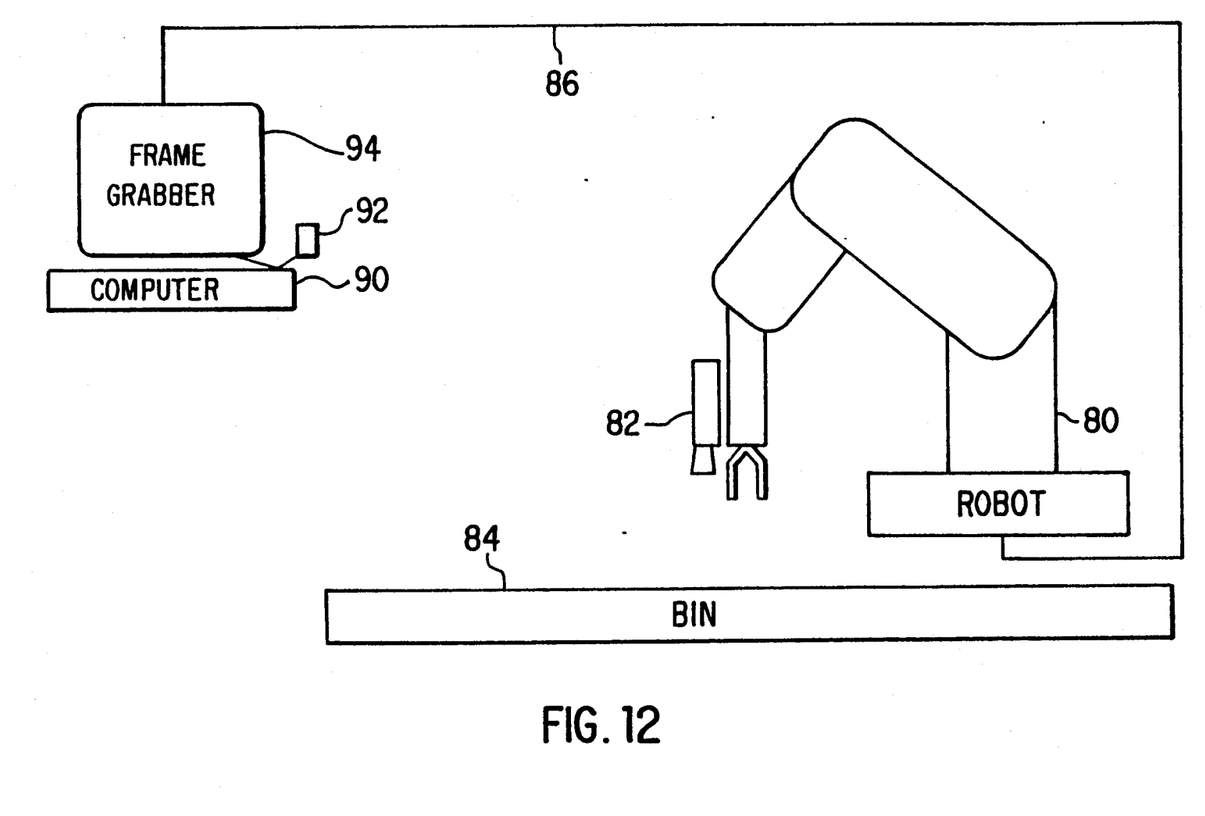
FIG. 12 is a block diagram of an automated tool selection system to which the present invention can be applied.
Figure 13:
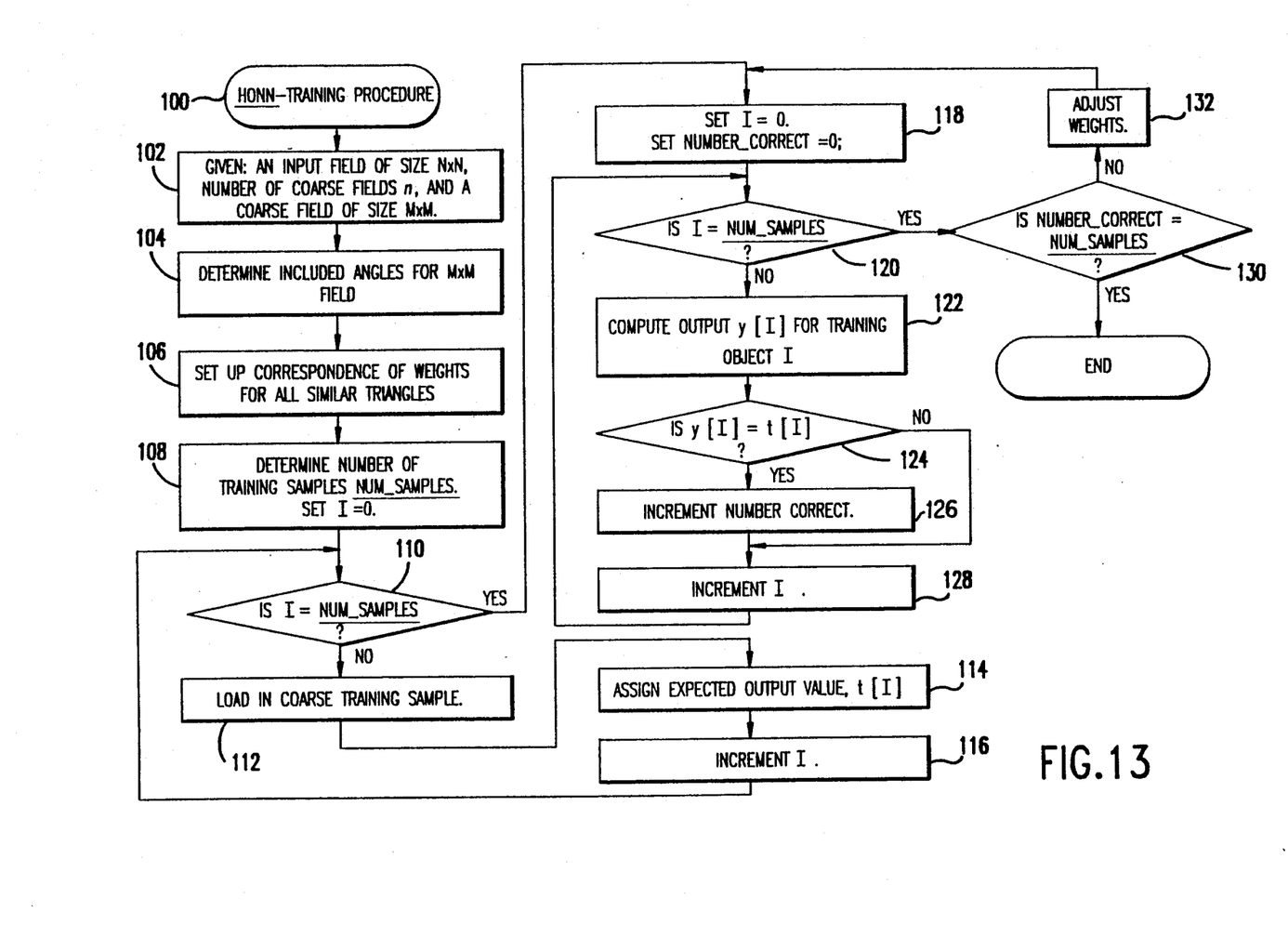
FIG. 13 is a flowchart illustrating a training procedure for use with a HONN according to the present invention.
Figure 14:
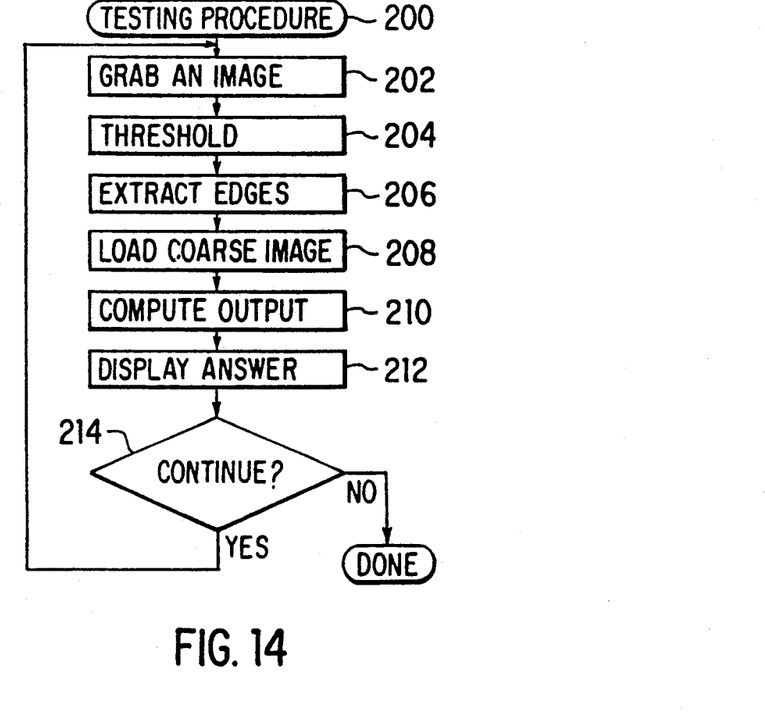
FIG. 14 is a flowchart illustrating a testing procedure for use with a HONN according to the present invention.

One illustrative embodiment of the present invention will now be described. In this embodiment, the present invention is applied to an automated tool selection system. FIG. 12 is a block diagram of the automated tool selection system. FIG. 13 is a flow chart of the training procedure performed by the automated tool selecting system. FIG. 14 is a flowchart of the testing procedure performed by the automated tool selection system of FIG. 12.

The illustrative embodiment, shown in FIG. 12, illustrates how the present invention can be applied to the common robotics manufacturing task of "bin picking". This system includes a robot 80 having a camera 82 mounted on an arm thereof so as to observe the work space 84 below it. Work space 84 comprises a bin containing tools to be identified, with the tools being individually located in a bin space within the work area. Robot 80 is directed to look at each bin space in the work area and to identify the tool located there. The tool could be located at any location within the bin, and could be rotated in-plane. Additionally, the camera height is not held constant so the tools could vary in apparent size. Accordingly, a third-order neural network is appropriate. When the desired tool is found, the user is notified and a grappling operation is initiated.

The robot is controlled via a communications link 86 by a computer 90. Computer 90 includes a mouse 92 which, for example, functions as one means for inputting data to computer 90. A conventional frame grabber 94 is also coupled to computer 90, and will be discussed in more detail below.

Prior to directing the robot to begin identifying tools found in work space 84, computer 90 runs the training procedure. Finally, as each object in the work space is observed, it is transmitted (via communications link 86) to computer 90 which runs the testing procedure to be described below.

FIG. 13 shows the training procedure 100. The training procedure begins with an assumed (programmer set) input field size, N×N, number of coarse-code fields, n, and coarse-code field size, M×M (step 102). The following step (104) determines the included angles $\alpha$, $\beta$, and $\gamma$ (to some granularity), for all triangles which are formed by connecting all possible combinations of three pixels in a given coarse-code input field (i.e., having the size M×M).

Since this computation is expensive, and the combination of triplets for a given field size does not depend on the objects to be distinguished, these angles can be predetermined and stored in a file. Step 104 would then be modified to read the included angles corresponding to each combination of three pixels from a file, rather than determining them in real time.

Step 106 then sets up the correspondence between the angles, $\alpha$, $\beta$, and $\gamma$ (using the same granularity as in step 104), for example, using equation (7) such that all triplets of the angles which are members of the alternating group (i.e., the order of the angles matters, but not which angle comes first) point to a single memory location. This assures that all similar triangles will manipulate the same weight value as described above.

One possible implementation of step 106 is to use three matrices (w, w_angle and w_invar) linked with pointers. Each location in w (indexed by the triplet i,j,k representing the input pixels) points to a location in w_angle (indexed by the triplet $\alpha,\beta,\gamma$ representing the angles formed by the triplet i,j,k). Similarly, each location in w_angle points to a location in w_invar, also indexed by a triplet of angles $\alpha,\beta,\gamma$ such that the smallest angle is assigned to $\alpha$. That is, w_angle [80] [60] [40] points to w_invar [40] [80] [60], as do the elements w_angle [60] [40] [80] and w_angle [40] [80] [60].

In step 108, the number of training samples can be either user input or programmer set. If two different types of tools are contained in bin 84, NUM_SAMPLES=2, and only a single output node is required for the neural network. Steps 110 to 116 read in the training data (breaking the input image into the sub-pattern data for each coarse-code field) and assign the expected output value t[I] to each training pattern. The expected output value t[I] is user determined, and is based upon the number of objects being distinguished. For example, if the network is distinguishing between two different objects in a manner which is invariant to translation, scaling, and in-plane rotation, a single-layer, third-order neural network having a single output node as illustrated in FIG. 11 can be used. If the hard limiting transfer function illustrated by equation (12) is used, one of the training patterns would be assigned the value of t=0, while the other training pattern would be assigned the value t=1.

Training, as described above, begins in step 118. Steps 118 to 128 determine the output, y, (by summing the weights for all triangles which are ON in the current training object in accordance with equation (12)) and compare the output, y, to the expected output value, t, for each training object. The weights, w, for each link are initially set to 0 or some other random number. The network is fully trained when it correctly recognizes all of the training images (step 130=yes), and then the testing procedure can be initiated. Otherwise, the weights are adjusted in step 132 by adding in the difference between the expected and generated output in accordance with, for example, equation (9), and going back to step 118.

The last procedure, the testing procedure illustrated in FIG. 14 is called each time the robot observes a new object. An image is grabbed in step 202 via a frame grabber 94 connected to the camera 82 which is mounted onto the arm of robot 80. The image is then binarized via thresholding in step 204, and its edges are extracted in step 206. The thresholding and edge extraction can be performed by conventional means. Steps 204 and 206 are usually necessary in a real-time vision system since the pattern is supplied directly from a camera. However, in other applications, steps 204 and 206 may not be required if the pattern is supplied as a binary edge-only pattern.

It is preferable to input patterns comprised of only pixels located along the edge of the object so as to improve the network's invariance to scaling. This applies to both the training patterns utilized in step 112 and the test patterns utilized in the testing procedure. The use of outlines of the pattern (instead of the entire pattern) reduces the number of new pixel triplets which are introduced when the pattern is enlarged. However, if invariance to scale is not important, edge extraction is not necessary.

Steps 208 and 210 are performed so as to determine the coarse images (sub-patterns) for the object to be tested, which are then supplied to the input nodes of the corresponding fields of the neural network in accordance with equation (12) to determine the output y. Step 210, in essence, produces the network's hypothesis about what the object in the camera's field of view is. This hypothesis, for example, is displayed 212 (or the robot is directed to grapple the object) and the testing procedure is repeated for the next image 214.

The present invention is applicable to many other applications in addition to the tool selecting application described above. The present invention can be used to recognize patterns of, for example, characters or aircraft. Moreover, coarse-coding can be used whenever coded data is input to a neural network for recognition purposes or for other analysis, in order to reduce the number of interconnections required in the neural network.

The coarse coding technique described above was evaluated using the expanded version of the T/C problem. (See the above-incorporated references by Reid et al. and Spirkovska et al. for a more detailed description of the T/C problem.) Implementing coarse coding using the intersection of fields described above, the input image resolution for the T/C problem was increased to 127×127 pixels using 9 coarse-code fields of 15×15 coarse pixels. The network was trained on just two images: the largest T and the largest C possible within the 127×127 input field. Training took just 5 passes.

A complete test set of translated, scaled and 1° rotated views of the two objects in a 127×127 pixel input field consists of about 135 million images. Assuming a test rate of 200 images per hour, it would take about 940 computer months to test all possible views. Accordingly, testing was limited to a representative subset consisting of four sets:

(1) All translated views, but with the same orientation and scale as the training images.

(2) All views rotated in-plane at 1° intervals, centered at the same position as the training images but only 60% of the size of the training images.

(3) All scaled views of the objects, in the same orientation and centered at the same position as the training images.

(4) A representative subset of approximately 100 simultaneously translated, rotated, and scaled views of the two objects.

The network achieved 100% accuracy on test images in sets (1) and (2). Furthermore, the network recognized, with 100% accuracy, all scaled views, from test set (3), down to 38% of the original size. Objects smaller than 38% were classified as Cs. Finally, for test set (4), the network correctly recognized all images larger than 38% of the original size, regardless of the orientation or position of the test image.

Figure 15A:
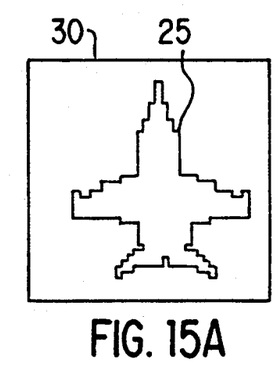
FIGS. 15A and 15B are patterns of aircraft which can be recognized using a HONN in accordance with the present invention.
Figure 15B:
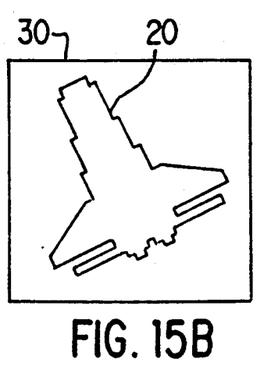

A third-order network also learned to distinguish between practical images, such as a space shuttle orbiter 20 versus an F-15 aircraft 25 (see FIG. 15A and 15B) in up to a 127×127 pixel input field. In this case, training took just six passes through the training set, which consisted of just one (binary, edge only) view of each aircraft. As with the T/C problem, the network achieved 100% recognition accuracy of translated and in-plane rotated views of the two images. Additionally, the network recognized images scaled to almost half the size of the training images, regardless of their position or orientation.

The minimum possible coarse-code field size is dependent on the training images. The network is unable to distinguish between the training images when the size of each coarse pixel is increased to the point where the training images no longer produced unique coarse-coded representations. As an example, with the T/C problem, the minimum coarse-code field size which still produces unique representations is 3×3 pixels.

In contrast, the maximum limit is determined by the HONN architecture and the memory available for its implementation, and not by the coarse-coding technique itself. The number of possible triplet combinations in a third-order network is $N^2$-choose-3 for an N×N pixel input field. Thus, given the memory constraints of the sun 3/60 discussed above, the maximum possible coarse-code field size was 18×18 pixels.

Regarding the number of coarse-code fields which can be used and still achieve object recognition invariant to translation, scaling, and in-plane rotation, the minimum is one field whereas the maximum has not been reached. A minimum of one coarse-code field represents the non-coarse-coded HONN case discussed with respect to FIGS. 2 and 5. In order to determine the limit for the maximum number of coarse-code fields possible, simulations were run on the T/C problem coded with a variable number of 3×3 coarse-code fields. A third-order network was able to distinguish between the two characters in less than 10 passes in an input field size up to 4095×4095 pixels using 2,047 fields. An input field resolution of 4096×4096 was also achieved using 273 fields of 16×16 coarse pixels. Increasing the number of fields beyond this was not attempted because 4096×4096 is the maximum resolution available on most image processing hardware which would be used in a complete HONN-based vision system.

The weighting techniques and threshold functions usable in a HONN constructed according to the present invention are not limited to the two examples provided above in equations (9) and (12). For example, see the above-incorporated references to Reid et al., Spirkovska et al., and Giles et al., which disclose different weight determination procedures (with or without invariance constraints) and different threshold functions (which, for example, produce output signals from the sets $(1, -1)$ or $(-1, 0, 1)$ instead of $(0, 1)$ as described above).

While this invention has been described in conjunction with specific embodiments thereof, many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A pattern analysis system comprising:
   means for coarse-coding an input pattern to form a plurality of sub-patterns collectively defining the input pattern, each of said sub-patterns comprising respective sets of sub-pattern data, each sub-pattern having a resolution less than a resolution of said pattern and corresponding to a low-resolution pattern of said entire pattern;
   a neural network having a plurality of fields equal in number to said plurality of sub-patterns, so that each field corresponds to one of said sub-patterns, each field including:
   a plurality of input nodes receiving the set of sub-pattern data from its corresponding sub-pattern;
   at least one summation point where weighted products of predetermined combinations of said input nodes are summed to determine a sub-pattern value; and
   interconnections between said input nodes and said at least one summation point defining said products and the weights associated with said products; said neural network also including:
   at least one output node, coupled to corresponding summation points from a plurality of said fields, which performs a threshold function on a summation of said sub-pattern values received at said at least one output node to produce an output signal said weights have values obtained by training the network to distinguish between a plurality of different training images which have been assigned respective output signals for said threshold function performed at said at least one output node, whereby said system can determine which of said plurality of training images corresponds to said input pattern by providing said output signal for said input pattern.

2. The system of claim 1, wherein said means for coarse-coding forms said sub-patterns by:
   (a) overlaying each of a plurality of coarse-code fields over said entire pattern, each coarse-code field being comprised of a matrix of coarse-code units, each coarse-code unit having a predetermined field size; and
   (b) assigning input values to the coarse-code units in each coarse-code field in accordance with a portion of said pattern over which said coarse-code unit is overlayed to define said sub-pattern data;
   wherein each coarse-code field overlaps said entire pattern, and said coarse-code fields are offset from each other so that the effect of each coarse-code field overlay adds to the effect of each other so as to cumulatively define said pattern as a high-resolution pattern having a matrix of pattern units, each pattern unit having a size less than said predetermined size of said coarse-code units, said high-resolution pattern having a greater number of said pattern units than each coarse-code field has coarse-code units.

3. The system of claim 2, wherein the coarse-code units in all of said coarse-code fields have the same size.

4. The system of claim 3, wherein said means for coarse-coding forms n sub-patterns of equally sized matrices of sub-pattern data having a size M×M, and said neural network includes n fields, each having M×M input nodes and an equal number of summation points, each summation point of each field corresponding to a summation point in each of the other fields to define at least one set of common summation points, each set of common summation points being coupled to a respective one of said at least one output nodes.

5. The system of claim 1, wherein said neural network is a higher order neural network such that each field has an architecture including said interconnections between said plurality of input nodes and said at least one summation point so that outputs of a plurality of said input nodes are multiplied together to produce intermediate values prior to being summed at said at least one summation point, said intermediate values being weighted prior to being summed.

6. The system of claim 5, wherein the outputs of said input nodes are multiplied together in pairs so that said network is a second order neural network.

7. The system of claim 5, wherein the outputs of said input nodes are multiplied together in triplets so that said network is a third order neural network.

8. The system of claim 5, wherein said intermediate values are weighted with constraints corresponding to known relationships between said combination of input nodes to provide said neural network with invariance.

9. The system of claim 5, wherein said coarse-code units correspond to pixels of an image.

10. A pattern recognition system comprising:

means for coarse-coding a test pattern to form n sub-patterns collectively defining the test pattern, each of said n sub-patterns comprising M×M matrices of sub-pattern pixel data, each sub-pattern having a resolution less than a resolution of said test pattern and corresponding to a low-resolution pattern of said entire test pattern;

a higher order neural network having n fields, each field corresponding to one of said sub-patterns and having a common architecture including:

M×M input nodes receiving said sub-pattern pixel data from its corresponding sub-pattern;

at least one summation point where weighted products of predetermined combinations of said input nodes are summed to provide a sub-pattern value; and interconnections between said input nodes and said at least one summation point defining said products and the weights associated with said products, each summation point corresponding to a common summation point in each of the other fields to define at least one set of common summation points; said neural network also including:

at least one output node, corresponding to a respective one of said at least one set of common summation points, which performs a threshold function on a summation of the sub-pattern values produced by the set of common summation points corresponding to said output node, said weights having values obtained by training said network to distinguish between a plurality of different training patterns which have been assigned respective output signals for said threshold function performed at said at least one output node whereby said system can determine which of said plurality of training images corresponds to said test pattern by providing said output signal for said test pattern.

11. The system of claim 10, wherein said means for coarse-coding forms said sub-patterns by:
(a) overlaying each of a plurality of coarse-code fields over said entire test pattern, each coarse-code field being comprised of a matrix of coarse-code pixels, each coarse-code pixel having a predetermined field size;
(b) assigning input values to the coarse-code pixels in each coarse-code in accordance with a portion of said test pattern over which said coarse-code pixel is overlayed to define said sub-pattern data;
wherein each coarse-code field overlaps said entire test pattern, and said coarse-code fields are offset from each other so that the effect of each coarse-code field overlay adds to the effect of each other so as to cumulatively define said test pattern as a high-resolution pattern having a matrix of pattern pixels, each pattern pixel of said matrix having a size less than said predetermined size of said coarse-code pixels, said high-resolution pattern having a greater number of said pattern pixels than each coarse-code field has coarse-code pixels.

12. The system of claim 11, wherein the coarse-code pixels in all of said coarse-code fields have the same size.

13. The system of claim 10, wherein said input nodes are interconnected in pairs so that said network is a second order neural network.

14. The system of claim 13, wherein said weights are constrained to provide invariance to translation and scale.

15. The system of claim 13, wherein said weights are constrained to provide invariance to translation and in-plane rotation.

16. The system of claim 10, wherein said input nodes are interconnected in triplets so that said network is a third order neural network.

17. The system of claim 16, wherein said weights are constrained to provide invariance to translation, scale, and in-plane rotation.

18. The system of claim 10, wherein said weights are constrained to provide said neural network with invariance.

19. A method of analyzing a pattern comprising:
coarse-coding an input pattern to form a plurality of sub-patterns collectively defining the input pattern, each of said sub-patterns comprising respective sets of sub-pattern data, each sub-pattern having a resolution less than a resolution of said pattern and corresponding to a low-resolution pattern of all of said pattern;
supplying said sub-pattern data to input nodes of a neural network having a plurality of fields equal in number to said plurality of sub-patterns, so that input nodes of each field receive the sub-pattern data from a corresponding one of said sub-patterns;
within each field, summing weighted products of predetermined combinations of said input nodes at summation points to produce at least one sub-pattern value for each field; and
supplying a summation of the sub-pattern values from a plurality of said fields to an output node of the neural network, coupled to corresponding summation points from a plurality of said fields, said output node performing a threshold function on said summation of sub-pattern values to produce an output signal
the weights associated with said products have values obtained by training the network to distinguish between a plurality of different training images which have been assigned respective output signals for said threshold function performed at said at least one output node, whereby said system can determine which of said plurality of training images corresponds to said input pattern by providing said output signal for said input pattern.

20. The method of claim 19, wherein said coarse-coding includes forming said sub-patterns by:
overlaying each of a plurality of coarse-code fields over said entire pattern, each coarse-code field being comprised of a matrix of coarse-code units, each coarse-code unit having a predetermined field size; and
assigning input values to the coarse-code units in each coarse-code field in accordance with a portion of said pattern over which said coarse-code unit is overlayed to define said sub-pattern data;
wherein each coarse-code field overlaps said entire pattern, and said coarse-code fields are offset from each other so that the effect of each coarse-code field overlay adds to the effect of each other so as to cumulatively define said pattern as a high-resolution pattern having a matrix of pattern units, each pattern unit having a size less than said predetermined size of said coarse-code units, said high-resolution pattern having a greater number of said pattern units than each coarse-code field has coarse-code units.

21. The method of claim 20, wherein the coarse-code units in all of said coarse-code fields have the same size.

22. The method of claim 21, wherein said coarse-coding forms n sub-patterns of equally sized matrices of sub-pattern data having a size M×M, and said neural network includes n fields, each having a common architecture including M×M input nodes and an equal number of said summation points, each summation point of each field corresponding to a summation point in each of the other fields to define at least one set of corresponding summation points, the summation of each set of corresponding summation points being supplied to a corresponding output node.

23. The method of claim 19, wherein said neural network is a higher order neural network such that each field has an architecture including interconnections between said plurality of input nodes and said at least one summation point so that outputs of a plurality of said input nodes are multiplied together to produce intermediate values which are weighted prior to being summed to produce said sub-pattern value.

24. The system of claim 23, wherein the outputs of said input nodes are multiplied together in pairs so that said network is a second order neural network.

25. The method of claim 24, wherein said pattern is an image so that said sub-pattern data is pixel data, and said intermediate values are weighted with constraints to provide said network with invariance to translation and scaling of said pattern.

26. The method of claim 24, wherein said pattern is an image so that said sub-pattern data is pixel data, and said intermediate values are weighted with constraints to provide said network with invariance to translation and in-plane rotation of said pattern.

27. The system of claim 23, wherein the outputs of said input nodes are multiplied together in triplets so that said network is a third order neural network.

28. The method of claim 24, wherein said pattern is an image so that said sub-pattern data is pixel data, and said intermediate values are weighted with constraints to provide said network with invariance to translation, scaling, and in-plane rotation of said pattern.

29. The system of claim 23, wherein said intermediate values are weighted with constraints corresponding to known relationships between said combinations of input nodes to provide said network with invariance to said known relationships.

30. The system of claim 23, wherein said pattern is an image, and said coarse-code units correspond to pixels.

* * * * *